United States Patent [19]

Tsurutani et al.

[11] Patent Number: 5,468,807
[45] Date of Patent: Nov. 21, 1995

[54] RESIN COMPOSITION

[75] Inventors: Iwao Tsurutani, Chiba; Takafumi Manabe; Ikuo Emoto, both of Sakai, all of Japan

[73] Assignees: Ube Rexene Corporation, Tokyo; Ube Industries, Ube, both of Japan; Rexene Corporation, Dallas, Tex.

[21] Appl. No.: 284,271

[22] Filed: Aug. 2, 1994

Related U.S. Application Data

[63] Continuation of Ser. No. 924,552, Aug. 5, 1992, abandoned.

[30] Foreign Application Priority Data

Aug. 8, 1991 [JP] Japan ................................. 3-223459

[51] Int. Cl.$^6$ ........................... C08L 23/10; C08L 23/16; C08L 23/20
[52] U.S. Cl. ................... 525/240; 525/71; 525/74; 525/78; 525/88; 525/95
[58] Field of Search ................................. 525/240, 88

[56] References Cited

U.S. PATENT DOCUMENTS

| | | | |
|---|---|---|---|
| 3,846,349 | 11/1974 | Harada et al. | 525/240 |
| 4,186,240 | 1/1980 | Matsuda et al. | |
| 4,211,852 | 7/1980 | Matsuda et al. | |
| 4,395,519 | 7/1983 | Minami et al. | 525/75 |

FOREIGN PATENT DOCUMENTS

| | | |
|---|---|---|
| 0119508 | 2/1984 | European Pat. Off. |
| 0455813 | 6/1991 | European Pat. Off. |
| 2404025 | 4/1979 | France. |
| 2033803 | 1/1972 | Germany. |
| 54-52157 | 4/1979 | Japan. |
| 54-48846 | 4/1979 | Japan. |
| 54-48845 | 4/1979 | Japan. |
| 58-089635 | 5/1983 | Japan. |
| WO91/08259 | 6/1991 | WIPO. |

*Primary Examiner*—Carman J. Securro, Jr.
*Attorney, Agent, or Firm*—Armstrong, Westerman, Hattori, McLeland and Naughton

[57] ABSTRACT

The present invention provides a resin composition including (a) 20–80% by weight of an amorphous polyolefin having a propylene and/or butene-1 component content of 50% by weight or more, and (b) 80–20% by weight of a crystalline polypropylene. This resin composition is well balanced in mechanical strength and flexibility and gives rise to no environmental pollution.

7 Claims, 1 Drawing Sheet

RESIN COMPOSITION

This application is a continuation of application Ser. No. 07/924,552 filed Aug. 5, 1992, now abandoned.

BACKGROUND OF THE INVENTION AND RELATED ART STATEMENT

The present invention relates to a novel resin composition. More particularly, the present invention relates to a novel soft polypropylene resin composition having flexibility at normal temperature and a sufficient mechanical strength at high temperatures.

In recent years, soft vinyl chloride resins containing a plasticizer have been widely used as a soft resin for sheets or films. Soft vinyl chloride resins, however, may give rise to social problems such as (1) toxicity problem caused by bleed-out of plasticizer or monomer used therein and (2) acid rain derived from hydrogen chloride generated by burning thereof.

Meanwhile, as a soft resin comparable to the soft vinyl chloride resins, there are resins using ethylene as a main component, such as ethylene/vinyl acetate copolymer, ethylene/ethyl acrylate copolymer, ionomer, linear low-density polyethylene, ultralow-density polyethylene, ethylene/propylene copolymer and the like. These ethylene- based soft resins, however, are not balanced in flexibility and mechanical strength. That is, resins having sufficient flexibility at normal temperature tend to have a low mechanical strength at about 80° C., while resins having an excellent mechanical strength at about 8° C. have low flexibility at normal temperature.

It was attempted to allow a polypropylene resin inherently having an excellent mechanical strength to have flexibility by copolymerizing propylene with ethylene to obtain a propylene/ethylene copolymer having a lower melting point, a sufficient mechanical strength and flexibility. In this approach, however, the ethylene content is at best 5–6% by weight under the present technique; hence, it is difficult to obtain a polypropylene having flexibility comparable to that of soft vinyl chloride resins.

In view of the above situation, an object of the present invention is to provide a soft resin composition other than soft vinyl chloride resins, in particular, a resin composition having excellent flexibility and mechanical strength over a temperature range from normal temperature to high temperatures.

Other object of the present invention is to provide a resin composition which has a low cost and which can be suitably used in various applications, for example, as a packaging film or sheet, a building material sheet in the construction field, a carpet backing in the automobile and construction fields, an insulator for cable, a fiber, and a base material for tape.

SUMMARY OF THE INVENTION

According to the present invention, there is provided a resin composition comprising:
(a) 20–80% by weight of an amorphous polyolefin having a propylene and/or butene-1 component content of 50% by weight or more, and
(b) 8–2% by weight of a crystalline polypropylene.

The resin composition of the present invention has the above constitution. By compounding a propylene- and/or butene-1 containing amorphous polymer and a crystalline polypropylene in given proportions, there can be obtained a resin composition which has sufficient flexibility while retaining the high mechanical strength inherently possessed by the polypropylene. The resin composition of the present invention gives rise to no environmental pollution as seen in soft vinyl chloride resins which are a main stream of conventional soft resins.

DETAILED DESCRIPTION OF THE INVENTION

Figure 1:
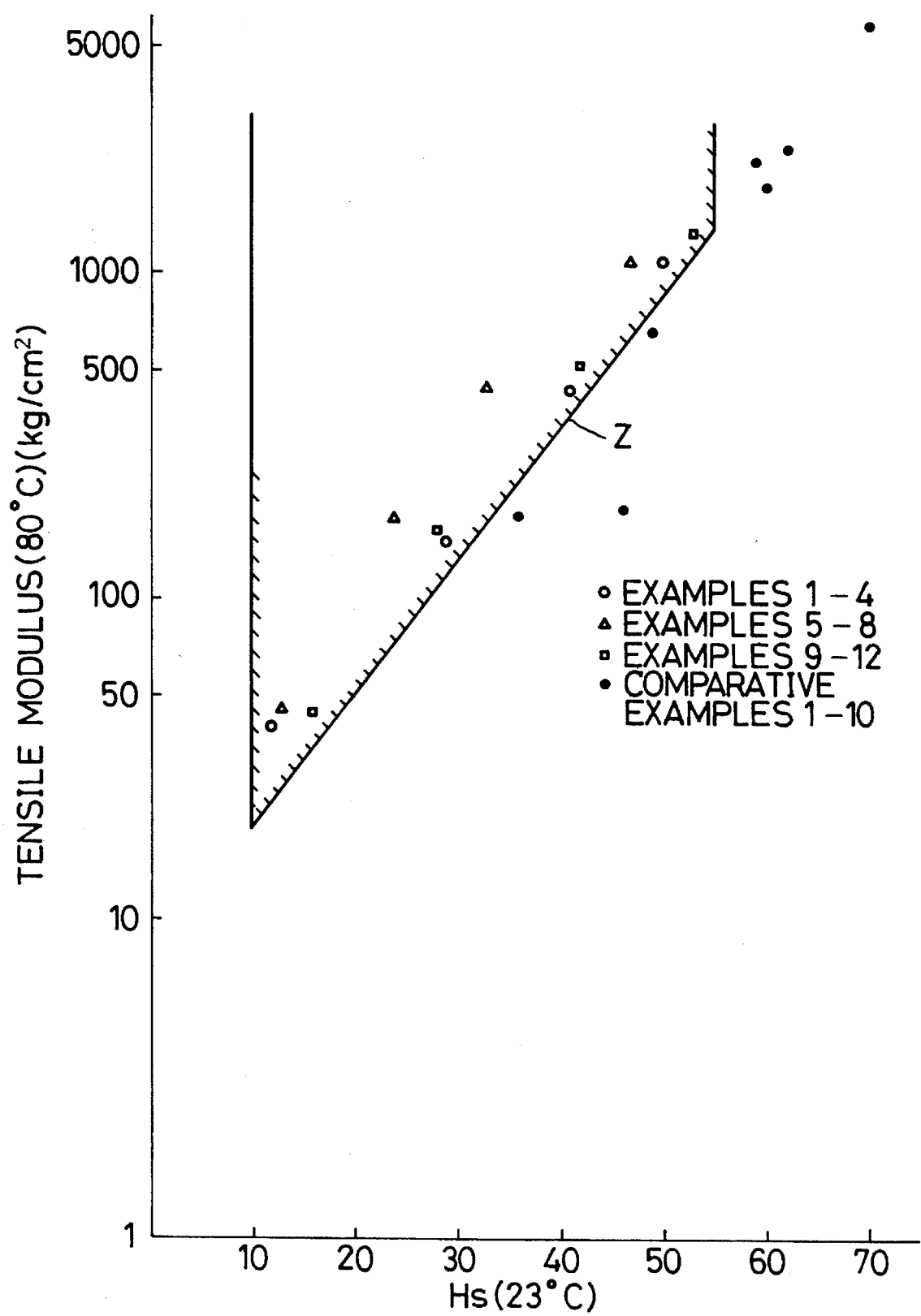
FIG. 1 is a graph showing the relations between Shore D hardness Hs (23° C.) and tensile modulus (80° C.), of the resin compositions of Examples and Comparative Examples.

The amorphous polyolefin used as the component (a) in the present invention can be any olefin polymer having a propylene and/or butene-1 component content of 50% by weight or more. It can be, for example, an amorphous polypropylene or a propylene/other α-olefin copolymer.

When the propylene and/or butene-1 component content in the amorphous polyolefin is less than 50% by weight, the amorphous polyolefin has low compatibility with the crystalline polypropylene [the component (b)], which is not preferable.

It is preferable that the amorphous polyolefin of the present invention has a heat of crystallization within a certain limitation. To be more precise, when the amorphous polyolefin is a propylene/butene-1 copolymer, a heat of crystal fusion is desired to be less than 10 Joule/g, and when the amorphous polyolefin is a propylene/ethylene copolymer, a heat of crystal fusion is desired to be 20 Joule/g or less. In case that the heat of crystal fusion is beyond its limitation, the amorphous polyolefin has low flexibility.

Incidentally, the heat of crystal fusion was measured as follows.

The heat of crystal fusion was measured in accordance with the straight line extended to the side of lower temperatures from a curved line of specific heat obtained by differential scanning calorimetry under a condition of perfect fusion of polymer. The measurement was proceeded by the use of DSC-50 produced by Shimadzu Corporation, about 10 mg of the sample, and Indium as a caloric standard under nitrogen atmosphere with the following heating program:

In the first place, the sample was heated up to 210° C. with temperature increase of 50° C. per minute. After leaving the sample at 210° C. for five minutes, it was cooled down to −42° C. with temperature decrease of 10° C. per minute. After leaving the sample at −42° C. for five minutes, the measurement was proceeded from the temperature range of −40° C. to 200° C. with temperature increase of 20° C. per minute.

The amorphous polyolefin [the component (a)] of the present invention desirably has a boiling-n-heptane content (i.e. a boiling-n-heptane content when subjected to Soxhlet extraction) of 70% by weight or less, preferably 60% by weight or less, particularly preferably 10% by weight or less. When the boiling-n-heptane content is more than 70% by weight, the proportion of the amorphous portion in the amorphous polyolefin is small, making it impossible to obtain a resin composition having desired sufficient flexibility. The amorphous polyolefin [the component (a)] desirably has a number-average molecular weight of 1,000–2000, preferably 1,500–1000,000.

The boiling-n-heptane content was measured by the method of Soxhlet extraction, using 2 g of cubes with each side measuring between 3 and 5 mm.

In the present invention, it is possible to use one or more amorphous polyolefins.

As the amorphous polypropylene, there may be used an atactic polypropylene which is produced as a by-product in producing a crystalline polypropylene. Alternatively, the amorphous polypropylene may be produced as such from a raw material. The propylene/other α-olefin copolymer can be produced as an intended product, from raw materials containing propylene in a desired proportion.

When the amorphous polyolefin [the component (a)] is produced as an intended product, it can be obtained by, for example, polymerizing raw material monomers using (a) a titanium catalyst supported on magnesium chloride and (b) triethylaluminum, in the presence or absence of hydrogen. Use of an amorphous polyolefin produced as an intended product is preferable in view of its stable supply and stable quality. As the amorphous polyolefin [the component (a)], there may be used a commercial product if there is an appropriate commercial product.

Specific examples of the amorphous polyolefin [the component (a)] include those containing propylene as a main component and having properties mentioned above, such as polypropylene, propylene/ethylene copolymer, propylene/butene-1 copolymer, propylene/butene-1/ethylene terpolymer, propylene/hexene-1/octene-1 terpolymer, propylene/hexene-1/4-methylpentene-1 terpolymer and the like.

The propylene/ethylene copolymer used as the amorphous polyolefin, desirably contains an ethylene component in an amount of 0–30% by weight, preferably 1–20% by weight. When the amount of the ethylene component is larger than 30% by weight, the resulting resin composition is too soft, has high surface tackiness, and is inconvenient to handle. The propylene/butene-1 copolymer used as the amorphous polyolefin, desirably contains a butene-1 component in an amount of 0–50% by weight, preferably 1–50% by weight and most preferably 10–50% by weight. When the amount of the butene-1 component is larger than 50% by weight, the resulting resin composition has too low a softening point.

As the amorphous polyolefin [the component (a)] of the present invention, a propylene/butene-1 copolymer containing a butene-1 component in an amount of 10–5% by weight can be preferably used because it is superior in tensile elongation, impact resilience and cohesiveness. An example of such a copolymer is REXTAC (a commercial product) of REXENE Co. of U.S.

The crystalline polypropylene [the component (b)] of the present invention refers to an isotactic polypropylene insoluble in boiling n-heptane and includes commercially available polypropylenes used for extrusion, injection molding, blow molding, etc. It may be a propylene homopolymer, or a copolymer between an isotactic polypropylene of stereoregularity and other α-olefin.

As the crystalline polypropylene [the component (b)], there may be used a commercial product or a product produced as such. The production of crystalline polypropylene is not critical and can be conducted using a process appropriately selected from conventional processes used for production of crystalline polypropylene.

α-Olefin used in copolymerization with a crystalline polypropylene is preferably an α-olefin of 2–8 carbon atoms, such as ethylene, butene-1, pentene-1, hexene-1, heptene-1, octene-1 or the like. Of these, ethylene or butene-1 is particularly preferable.

As the crystalline polypropylene [the component (b)] of the present invention, there are preferably mentioned a propylene homopolymer; a propylene/ethylene random or block copolymer having an ethylene component content of 1–30% by weight, preferably 2–25% by weight; a propylene/butene-1 random or block copolymer having a butene-1 component content of 1–20% by weight. Of these, a propylene/butene-1 copolymer is particularly preferable in view of the applications (film, sheet, etc.) of the present resin composition.

The crystalline polypropylene [the component (b)] can be used singly or in combination of two or more of (co)polymers.

In the present invention, the component (a) and/or the component (b) may be used in modified forms (form). That is, the component (a) or (b) may be used after being modified with an unsaturated carboxylic acid (e.g. acrylic acid, methacrylic acid, ethacrylic acid, maleic acid, fumaric acid, itaconic acid) and/or its derivative (e.g. ester, acid anhydride, metal salt). Of the modification products, preferable is a product modified with maleic anhydride or itaconic anhydride, and more preferable is a product modified with maleic anhydride.

The production of the present resin composition comprising the components (a) and (b) is not critical and can be carried out by a method ordinarily used in the production of conventional polypropylene composition, wherein melt kneading is conducted with heating, using, for example, a kneader (e.g. kneader, Banbury mixer, rolls) or a single-screw or twin-screw extruder.

The present resin composition may contain, as necessary, various additives, reinforcing agents and fillers, such as heat stabilizer, antioxidant, light stabilizer, antistatic agent, lubricant, nucleating agent, flame retardant, pigment or dye, glass fiber, carbon fiber, calcium carbonate, calcium sulfate, barium sulfate, magnesium hydroxide, mica, talc, clay and the like.

The present resin composition may further contain, as necessary, other thermoplastic resins, elastomers, rubbers, etc. It is possible that these resins, elastomers, rubbers, etc. be compounded so as to form a crosslinked structure.

The resin composition of the present invention can be obtained by compounding the component (a) and the component (b) so that the content of the component (a) becomes 20–80% by weight, preferably 25–75% by weight. When the content of the component (a) is less than 20% by weight, the resulting resin composition has a Shore hardness Hs (23° C.) of more than 60 and has insufficient flexibility. When the content of the component (a) is more than 80% by weight, the resin composition has a Shore hardness Hs (23° C.) of less than 8, is too soft at normal temperature, has a tensile modulus (80° C.) of less than 30 kg/cm$^2$, and is unable to keep its own shape and mechanical strength satisfactorily.

In compounding the component (a) and the component (b) to obtain the present resin composition, it is preferable to control the Shore D hardness Hs (23° C.) of the present resin composition at 8 to 60 and the tensile modulus (80° C.) of 30 kg/cm$^2$ to less than 2,000 kg/cm$^2$.

More preferably, the shore D hardness Hs (23° C.) and the common logarithm Y of the tensile modulus (80° C.) satisfy the following formulas (1) and (2) because the resulting resin composition has higher flexibility at normal temperature, shows no reduction in mechanical strength at about 8°

C., and is well balanced in flexibility and mechanical strength.

$$10 \leq Hs\ (23°\ C.) \leq 55 \quad (1)$$

$$y \leq 0.04163 Hs\ (23°\ C.) + 0.8665 \quad (2)$$

In the present invention, Shore D hardness Hs (23° C.) and tensile modulus (80° C.) were measured in acordance with the following methods.

Shore D hardness Hs (23° C.)

A resin composition was subjected to press molding consisting of 2 minutes of preheating, 1 minute of pressing (temperature =180° C., pressure =100 kg/cm$^2$) and 3 minutes of cooling, to obtain a sheet of 2 mm in thickness.

The sheet was kept in a constant-temperature room of 23° C. and piled in 6 layers (6 sheets), after which a hardness meter was pressed upon the uppermost layer and, after 5 seconds, the hardness of the sheet was measured.

Tensile modulus (80° C.)

The sheet obtained in the same manner as above was subjected to punching using a JIS No. 2 type dumbbell, to obtain a test piece.

The test piece having a sectional area of S cm$^2$ was subjected to a tensile test (crosshead speed =50 mm/min, distance between chucks =5 cm, chart speed =50 cm/min) in a constant-temperature chamber to measure a tensile load X kg when 2% distortion occurred, while reading the displacement of the distance between chucks on the chart. The tensile modulus (80° C.) of the test piece was calculated from the S and X obtained, using the following formula (3).

$$\text{Tensile modulus (80° C.) (kg/cm}^2\text{)} = [X/S]/[2/100] = 100X/2S \quad (3)$$

As mentioned above, the resin composition of the present invention has excellent flexibility at normal temperature and a high mechanical strength at about 80° C., and can be used alone as a resin for film, sheet, bottle, pipe, fibrous material, porous film and other general molded articles, all of which have heretofore been made of a soft polymer. The molding of the present resin composition into the above articles can be conducted by an ordinary molding method such as extraction, injection molding, blow molding, press molding, stretching or the like. A film, a sheet and a blown bottle made of a single layer of the present resin composition can be used in various aplications.

The resin composition of the present invention can also be used as a composite material with other polymer or the like, such as laminate with leather or polyvinyl chloride, laminate with polypropylene, polyethylene, nylon, polyester or the like, laminate with woven cloth or unwoven cloth, or other laminate. Examples of the laminates are a crystalline polypropylene/the present resin composition, a crystalline polypropylene/the present resin composition/a crystalline polypropylene and a crystalline polypropylene/the present resin composition/a polyethylene; and such laminates can reduce the surface tackiness of the present resin composition or can improve the surface hardness of the present resin composition. Said laminates can further have thereon a layer of good-gas-barrier resin [e.g. Eval (trade name) manufactured by KURARAY Co., Ltd.] to impart selective gas permeability, whereby a multi-layered film, a multi-layered sheet or a multi-layered bottle can be obtained.

The present resin composition can also be used as a foamed material. The molded articles obtained from the present resin composition can be subjected to known surface treatments such as coating, vapor deposition and the like.

The present invention is hereinafter described in detail by way of Examples. However, the present invention is by no means restricted by the Examples.

In the Examples, melting point was measured by using a differential scanning calorimeter, under the conditions of temperature elevation rate =10° C./min and helium flow rate =100 ml/min.

Examples 1–4

As the amorphous polyolefin [the component (a)], there was used REXTAC RT 2780 (trade name) which was a propylene/butene-1 copolymer manufactured by U.S. Rexene Co., having a propylene/butene-1 weight ratio of 65/35, a number- average molecular weight Mn of 6,500, a heat of crystal fusion of 7.2 Joule/g and a n-heptane insoluble of 5% by weight. As the crystalline polypropylene [the component (b)], there was used POLYPROPYLENE RF 355B (trade name) which was a polypropylene manufactured by Ube Industries, Ltd., having an MFR of 2.7 and an ethylene content of 4% by weight. The two components were melt-mixed in component ratios shown in Table 1, in a stainless steel beaker heated at 180° C., to obtain resin compositions.

The resin compositions were measured for Shore D hardness Hs (23° C.), tensile modulus (80° C.) and melting point by the methods mentioned above. The results are shown in Table 1.

TABLE 1

| | Example | | | |
|---|---|---|---|---|
| | 1 | 2 | 3 | 4 |
| Component ratio (% by weight) | | | | |
| Component (a): RT2780 | 80 | 60 | 40 | 20 |
| Component (b): RF355B | 20 | 40 | 60 | 80 |
| Properties | | | | |
| Melting point (°C.) | 138 | 138 | 138 | 138 |
| Hs (23° C.) | 16 | 28 | 42 | 53 |
| Tensile modulus (80° C.) (kg/cm$^2$) | 45 | 164 | 520 | 1355 |
| Function | | | | |
| y | 1.6532 | 2.2148 | 2.7160 | 3.1319 |
| 0.04163Hs + 0.8665 | 1.5326 | 2.0321 | 2.6150 | 3.0729 |

Examples 5–8

Resin compositions were obtained in the same manner as in Example 1 except that as the component (a), there was used REXTAC RT2585 (trade name) which was a propylene/ethylene copolymer manufactured by U.S. Rexene Co., having a propylene/ethylene weight ratio of 85/15, a number-average molecular weight Mn of 7,100, a heat of crystal fusion of 4.7 Joule/g and a n-heptane insoluble of 0.7% by weight and, as the component (b), there was used FM801 (trade name) which was a polypropylene manufactured by Union Polymer K.K., having an MFR of 9 and an ethylene content of 5.7% by weight and that the two components were used in ratios shown in Table 2.

The resin compositions were measured for Shore D hardness Hs (23° C.), tensile modulus (80° C.) and melting point in the same manners as in Example 1. The results are shown in Table 2.

methods for Shore D hardness (23° C.) and tensile modulus (8° C.).

Using the sheet, Shore D hardness Hs (23° C.), tensile modulus (80° C.) and melting point were measured in the same manners as in Example 1. The results are shown in Table 4.

Comparative Examples 2–3

Resin compositions were obtained in the same manner as in Example 1 except that the component (a)/component (b) ratios were as shown in Table 4.

The resin compositions were measured for Shore D

TABLE 2

|  | Example | | | |
| --- | --- | --- | --- | --- |
|  | 5 | 6 | 7 | 8 |
| Component ratio (% by weight) | | | | |
| Component (a): RT2585 | 80 | 60 | 40 | 20 |
| Component (b): FM801 | 20 | 40 | 60 | 80 |
| Properties | | | | |
| Melting point (°C.) | 132 | 132 | 132 | 132 |
| Hs (23° C.) | 13 | 24 | 33 | 47 |
| Tensile modulus (80° C.) (kg/cm$^2$) | 46 | 176 | 451 | 1083 |
| Function | | | | |
| y | 1.6628 | 2.2455 | 2.6542 | 3.0346 |
| 0.04163Hs + 0.8665 | 1.4077 | 1.8656 | 2.2403 | 2.8231 |

Examples 9–12

Resin compositions were obtained in the same manner as in Example 1 except that REXTAC RT2780 used in Example 1 was used as the component (a) and FM801 used in Example 5 was used as the component (b) and that the two components were used in ratios shown in Table 3.

The resin compositions were measured for Shore D hardness Hs (23° C.), tensile modulus (80° C.) and melting point in the same manners as in Example 1. The results are shown in Table 3.

hardness Hs (23° C.), tensile modulus (80° C.) and melting point in the same manners as in Example 1. The results are shown in Table 4.

Comparative Example 4

A sheet of 2 mm in thickness was prepared from FM801 [used in Example 5 as the component (B)] alone, in the same manner as in the test piece preparation mentioned above with respect to the test methods for Shore D hardness (23° C.) and tensile modulus (80° C.).

TABLE 3

|  | Example | | | |
| --- | --- | --- | --- | --- |
|  | 9 | 10 | 11 | 12 |
| Component ratio (% by weight) | | | | |
| Component (a): RT2780 | 80 | 60 | 40 | 20 |
| Component (b): FM801 | 20 | 40 | 60 | 80 |
| Properties | | | | |
| Melting point (°C.) | 132 | 132 | 132 | 132 |
| Hs (23° C.) | 12 | 29 | 41 | 50 |
| Tensile modulus (80° C.) (kg/cm$^2$) | 40 | 145 | 439 | 1127 |
| Function | | | | |
| y | 1.6021 | 2.1614 | 2.6425 | 3.0519 |
| 0.04163Hs + 0.8665 | 1.3661 | 2.0738 | 2.5733 | 2.9480 |

Comparative Example 1

A sheet of 2 mm in thickness was prepared from POLYPROPYLENE RF 355B [used in Example 1 as the component (B)] alone, in the same manner as in the test piece preparation mentioned above with respect to the test Using the sheet, Shore D hardness Hs (23° C.), tensile modulus (80° C.) and melting point were measured in the same manners as in Example 1. The results are shown in Table 4.

TABLE 4

|  | Comparative Example | | | |
|---|---|---|---|---|
|  | 1 | 2 | 3 | 4 |
| Component ratio (% by weight) | | | | |
| Component (a) | — | RT2780 10 | RT2780 90 | — |
| Component (b) | RF355B 100 | RF355B 90 | RF355B 10 | FM801 100 |
| Properties | | | | |
| Melting point (°C.) | 138 | 138 | 138 | 132 |
| Hs (23° C.) | 62 | 58 | 8 | 60 |
| Tensile modulus (80° C.) (kg/cm$^2$) | 2500 | 2,000 | 24 | 1938 |
| Function | | | | |
| y | 3.3979 | 3.3010 | 1.3802 | 3.2874 |
| 0.04163Hs + 0.8665 | 3.4476 | 3.2810 | 1.8656 | 3.3643 |

Comparative Examples 5–10

Sheets of 2 mm in thickness were prepared using only one of the following resins, in the same manner as in Comparative Example 1.

Z517 (trade name), a very low-density polyethylene manufactured by Ube Industries, Ltd., of MI=2.0 g/10 min and density =0.906 g/cm$^2$ (Comparative Example 5)

640UF (trade name), a high-density polyethylene manufactured by Idemitsu Petrochemical K.K., of MI=0.05 g/10 min and density =0.955 g/cm$^3$ (Comparative Example 6)

FA120N (trade name), linear low-density polyethylene manufactured by Ube Industries, Ltd., of MI=1.0 g/10 min and density =0.920 g/cm$^3$ (Comparative Example 7)

L719 (trade name), a low-density polyethylene manufactured by Ube Industries, Ltd., of MI=7.5 g/10 min and density =0.918 g/cm$^3$ (Comparative Example 8)

V315 (trade name), an ethylene/vinyl acetate copolymer manufactured by Ube Industries, Ltd., of MI=17 g/10 min and vinyl acetate content =15% by weight (Comparative Example 9)

J109 (trade name), a homopolypropylene manufactured by Ube Industries, Ltd., of MFR=9 g/10 min (Comparative Example 10)

Using the sheets, Shore D hardness Hs (2° C.), tensile modulus (80° C.) and melting point were measured in the same manners as in Example 1. The results are shown in Table 5.

TABLE 5

|  | Comparative Example | | | | | |
|---|---|---|---|---|---|---|
|  | 5 | 6 | 7 | 8 | 9 | 10 |
| Resin component | Z517 | 640UF | FA120N | L719 | V315 | J109 |
| Properties | | | | | | |
| Melting point (°C.) | 114 | 130 | 123 | 109 | 90 | 167 |
| Hs (23° C.) | 36 | 59 | 49 | 46 | 34 | 70 |
| Tensile modulus (80° C.) (kg/cm$^2$) | 177 | 2282 | 663 | 188 | 152 | 6065 |
| Function | | | | | | |
| y | 2.2480 | 3.3583 | 2.8215 | 2.2742 | 2.1818 | 3.7828 |
| 0.04163Hs + 0.8665 | 2.3652 | 3.3227 | 2.8614 | 2.7815 | 2.2819 | 3.7806 |

As is clear from the above Examples, the resin compositions of the present invention have flexibility at normal temperature and a tensile modulus of 30 kg/cm$^2$ or more at 80° C.

Based on the above Examples and Comparative Examples, the relation of (a) Shore D hardness (23° C.) and (b) tensile modulus (80° C.) is shown in FIG. 1 by taking the abscissa for (a) and the ordinate (expressed in logarithm) for (b). It is appreciated from FIG. 1 that the resin compositions of the present invention satisfy the formulas (1) and (2) shown above and are well balanced in flexibility and mechanical strength. FIG. 1 that the resin compositions of the present invention satisfy the formulas (1) and (2) shown above and are well balanced in flexibility and mechanical strength.

Incidentally, in each of Tables 1–5 are shown the common logarithm of tensile modulus (80° C.) and the right side [0.04163Hs (23° C.)+0.8665] of the above formula (2) corresponding to the straight line Z in FIG. 1.

What is claimed is:

1. A resin composition consisting essentially of:
   (a) 20–80% by weight of an amorphous polyolefin selected from the group consisting of copolymers of propylene with a minor amount of an other alpha-olefin component and having a boiling n-heptane insoluble content of 10% by weight or less, and a number average molecular weight Mn of 1,000–7,100, and (b) 80–20% by weight of a crystalline polypropylene, wherein the composition has a tensile modulus (80° C.) of 30 kg/cm$^2$ to less than 2,00 kg/cm$^2$ and the Shore D hardness Hs (23° C.) and the common logarithm y of the tensile modulus (80° C.) satisfy the following formulas (1) and (2):

$$10 \leqq Hs\ (23°\ C.) \leqq 55 \qquad (1)$$

$$Y \leqq 0.04163\ Hs\ (23°\ C.) + 0.8665 \qquad (2)$$

2. The resin composition of claim 1, wherein said amorphous polyolefin is a propylene/ethylene copolymer having a propylene content of 50% by weight or more.

3. The resin composition according to claim 1 wherein said amorphous polyolefin is a propylene/butene-1 copolymer.

4. A resin composition according to claim 1, wherein the amorphous polyolefin is a propylene/ethylene copolymer having a maximum ethylene component content of 30% by weight.

5. A resin composition according to claim 1, wherein the amorphous polyolefin is a propylene/butene-1 copolymer having a butene-1 component content of at least 1% by weight.

6. A resin composition according to claim 1, wherein the amorphous polyolefin is a propylene/butene-1 /ethylene terpolymer.

7. A resin composition according to claim 1, wherein said amorphous polyolefin has a heat of crystal fusion of 10 Joule/g or less.

* * * * *

UNITED STATES PATENT AND TRADEMARK OFFICE
CERTIFICATE OF CORRECTION

PATENT NO.: 5,468,807
DATED : November 21, 1995
INVENTOR(S): TSURUTANI et al.

It is certified that an error appears in the above-identified patent and that said Letters Patent is hereby corrected as shown below:

In claim 1 on lines 3 and 4 of column 11, "a tensile modulus ($80°C,$) of 30 kg/cm$^2$ to less than 2,00kg/cm$^2$" should be --a tensile modulus ($80°C$) of 30kg/cm$^2$ to less than 2,000kg/cm$^2$-- .

Signed and Sealed this

Fifteenth Day of May, 2001

Attest:

NICHOLAS P. GODICI

Attesting Officer      Acting Director of the United States Patent and Trademark Office